United States Patent
Dixon et al.

(10) Patent No.: US 7,924,854 B2
(45) Date of Patent: Apr. 12, 2011

(54) SYSTEM AND METHOD FOR BILLING END USERS IN A PEER-TO-PEER TRANSACTION IN A NETWORK ENVIRONMENT

(75) Inventors: Walter G. Dixon, Fuquay Varina, NC (US); Robert M. Batz, Raleigh, NC (US); Robert A. Mackie, Cary, NC (US); Mark Albert, Cary, NC (US); Chris O'Rourke, Apex, NC (US); Humberto Tavares, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 751 days.

(21) Appl. No.: 11/929,001

(22) Filed: Oct. 30, 2007

(65) Prior Publication Data

US 2009/0109983 A1 Apr. 30, 2009

(51) Int. Cl.
*H04L 12/56* (2006.01)

(52) U.S. Cl. .................. 370/401; 370/320
(58) Field of Classification Search .......... 370/230, 370/388, 401, 277, 469, 352, 315; 709/228, 709/203

See application file for complete search history.

(56) References Cited

U.S. PATENT DOCUMENTS

| | | | | |
|---|---|---|---|---|
| 5,757,783 A * | 5/1998 | Eng et al. | | 370/315 |
| 6,084,892 A * | 7/2000 | Benash et al. | | 370/401 |
| 6,574,239 B1 * | 6/2003 | Dowling et al. | | 370/469 |
| 6,714,962 B1 * | 3/2004 | Helland et al. | | 709/203 |
| 6,731,625 B1 * | 5/2004 | Eastep et al. | | 370/352 |
| 6,885,660 B2 | 4/2005 | Inbar et al. | | 370/352 |
| 7,173,933 B1 | 2/2007 | O'Rourke et al. | | 370/389 |
| 7,230,914 B2 * | 6/2007 | Sankar et al. | | 370/218 |
| 7,292,538 B1 | 11/2007 | O'Rourke et al. | | 370/252 |
| 7,308,266 B2 | 12/2007 | Du et al. | | 455/445 |
| 7,321,587 B2 * | 1/2008 | Gao et al. | | 370/388 |
| 7,706,373 B2 * | 4/2010 | Xu et al. | | 370/392 |
| 7,710,872 B2 * | 5/2010 | Vasseur | | 370/230 |
| 2004/0151181 A1 * | 8/2004 | Chu et al. | | 370/392 |
| 2005/0002335 A1 * | 1/2005 | Adamczyk et al. | | 370/230 |
| 2005/0044138 A1 | 2/2005 | Albert et al. | | 709/203 |
| 2006/0101098 A1 * | 5/2006 | Morgan et al. | | 707/204 |
| 2006/0149845 A1 * | 7/2006 | Malin et al. | | 709/228 |
| 2007/0129076 A1 | 6/2007 | Cho et al. | | 455/436 |
| 2007/0288593 A1 | 12/2007 | Wang | | 709/217 |
| 2007/0291764 A1 * | 12/2007 | Wu | | 370/395.5 |
| 2007/0291915 A1 | 12/2007 | Tseitlin et al. | | 379/114.04 |

(Continued)

OTHER PUBLICATIONS

Robert M. Batz, et al.; *System and Method for Associating an End User for Billing in a Network Environment*; U.S. Appl. No. 11/928,820, Oct. 30, 2007.

(Continued)

*Primary Examiner* — Thong H Vu
(74) *Attorney, Agent, or Firm* — Baker Botts L.L.P.

(57) ABSTRACT

A method for billing end users in a peer-to-peer transaction in a network environment is provided that includes a client services packet gateway operable to communicate with a first end user and a second end user in order to facilitate the peer-to-peer transaction and a flow manager element operable to receive one or more packets of the peer-to-peer transaction from one or more interfaces, such that the interface is a subscriber interface or a network interface. The flow manager is further operable to associate a first session object with the first user and associate a second session object with the second user.

19 Claims, 4 Drawing Sheets

U.S. PATENT DOCUMENTS

| | | | |
|---|---|---|---|
| 2008/0062891 A1* | 3/2008 | Van der Merwe et al. | 370/254 |
| 2008/0072280 A1* | 3/2008 | Tardo et al. | 726/1 |
| 2008/0207233 A1* | 8/2008 | Waytena et al. | 455/466 |
| 2008/0285487 A1* | 11/2008 | Forslow et al. | 370/277 |
| 2009/0028083 A1* | 1/2009 | Beser | 370/311 |
| 2009/0067437 A1 | 3/2009 | Krishnan | 370/395.53 |
| 2009/0109982 A1* | 4/2009 | Batz et al. | 370/401 |

OTHER PUBLICATIONS

United States Patent and Trademark Office, Office Action for U.S. Appl. No. 11/928,820, filed Oct. 30, 2007 in the name of Robert M. Batz et al., (16 pgs), Notification Date Aug. 17, 2009.

Robert M. Batz et al., U.S. Appl. No. 11/928,820, filed Oct. 30, 2007, Communication from the U.S. Patent and Trademark Office mailed Apr. 14, 2010.

* cited by examiner

| KUT | | | |
|---|---|---|---|
| KEY (IP) ADDRESS | DATA FIELD #1 | DATA FIELD #2 | DATA FIELD #3 |
| 1.1.1.1 | BMA WITHIN BILLING SYSTEM ELEMENT | JOHN SMITH | CURRENT SGSN |

ENTRY

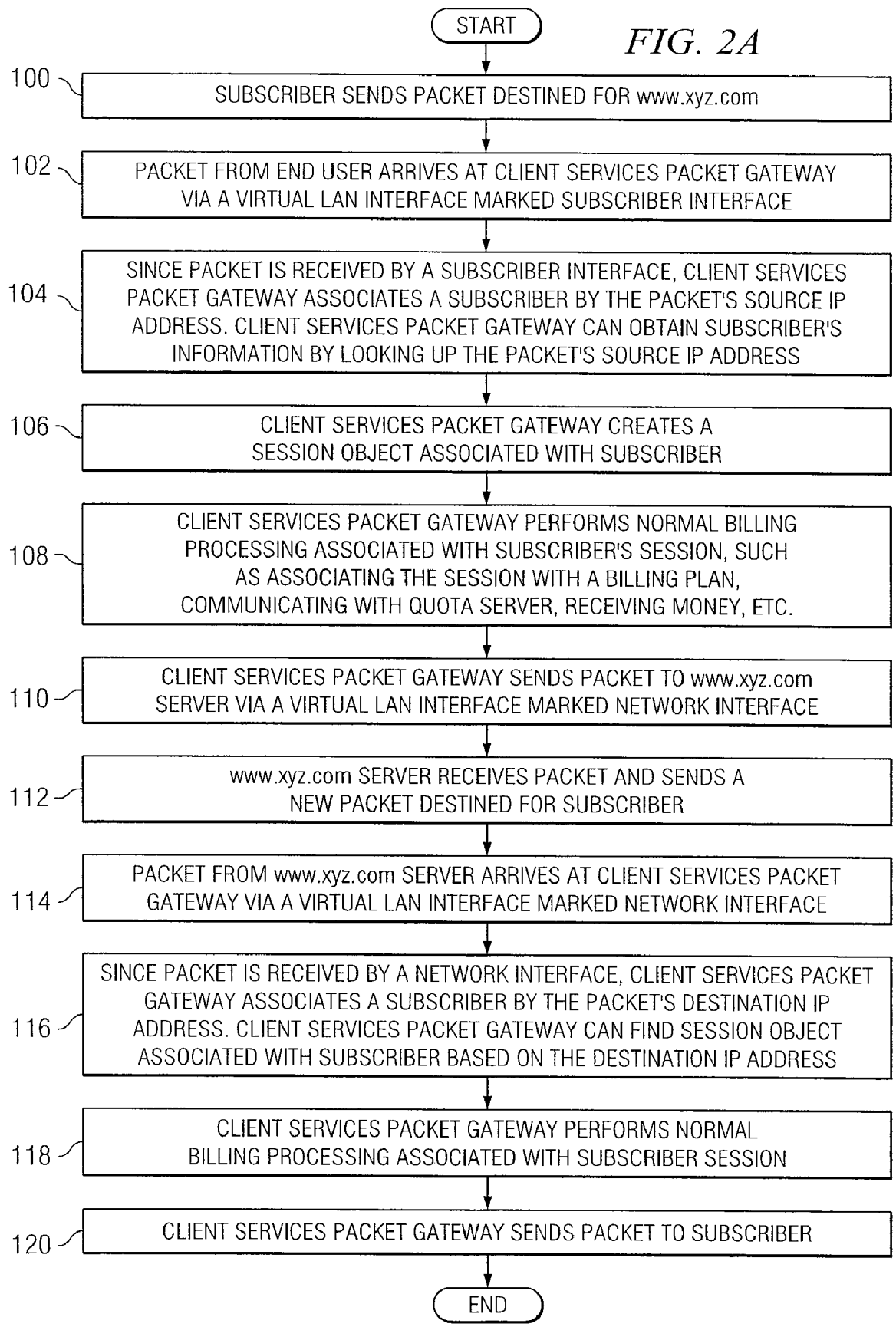

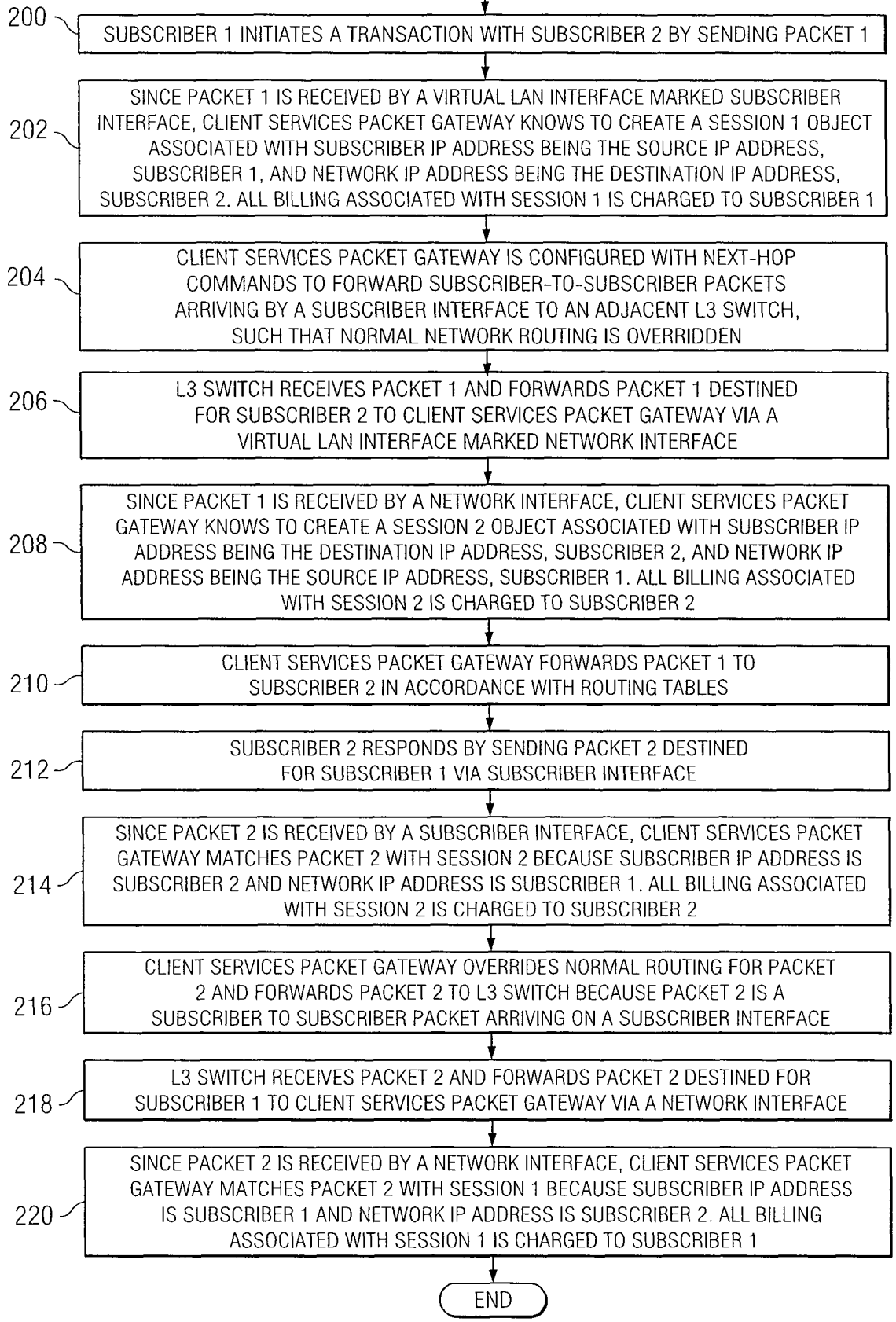

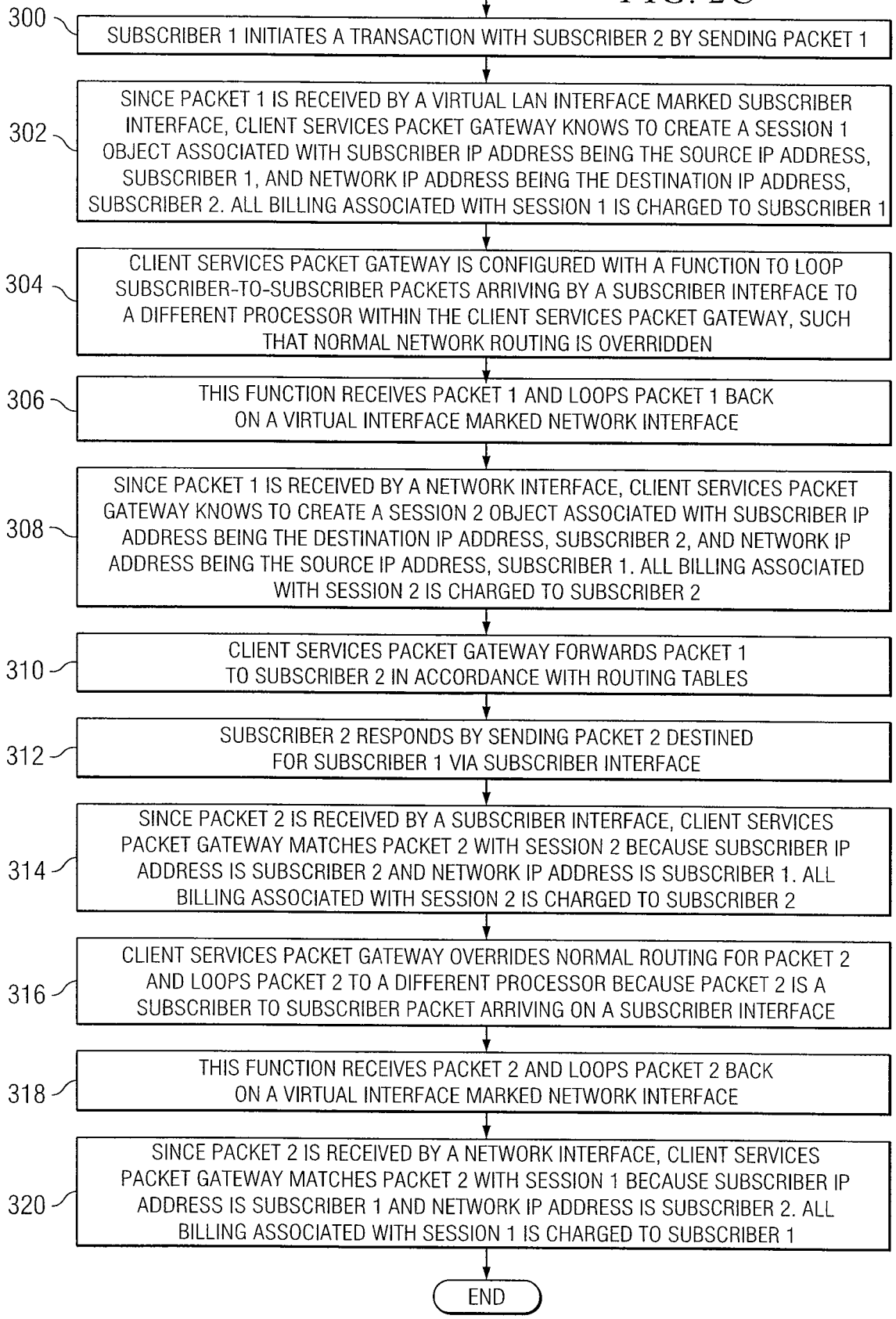

SYSTEM AND METHOD FOR BILLING END USERS IN A PEER-TO-PEER TRANSACTION IN A NETWORK ENVIRONMENT

TECHNICAL FIELD OF THE DISCLOSURE

This disclosure relates in general to the field of communications and, more particularly, for billing end users in a peer-to-peer transaction in a network environment.

BACKGROUND

Data networking architectures have grown increasingly complex in communication systems and environments. Some network equipment may be used to bill end users for services during a transaction. When an end user communicates with a network server during the transaction, the end user generally incurs a charge associated with the use of network resources and/or the value of the content received from the network server.

As the subscriber base of end users increases and/or becomes mobile, efficient management of communication sessions and data flows becomes even more critical. Some network equipment may provide incorrect information or inaccurate data for the end user. In certain scenarios, an end user may not be properly billed in a peer-to-peer transaction. In other cases, network equipment may use incorrect data to associate the transaction with an end user. Thus, the ability to properly and quickly manage accurate information in a network environment presents a significant challenge to system designers and network operators.

BRIEF DESCRIPTION OF THE DRAWINGS

FIG. 2A illustrates an example method for billing end users in a peer-to-peer transaction;

FIG. 2B illustrates another example method for billing end users in a peer-to-peer transaction; and FIG. 2C illustrates another example method for billing end users in a peer-to-peer transaction.

DESCRIPTION OF EXAMPLE EMBODIMENTS

Overview

Figures 1A, 1B:
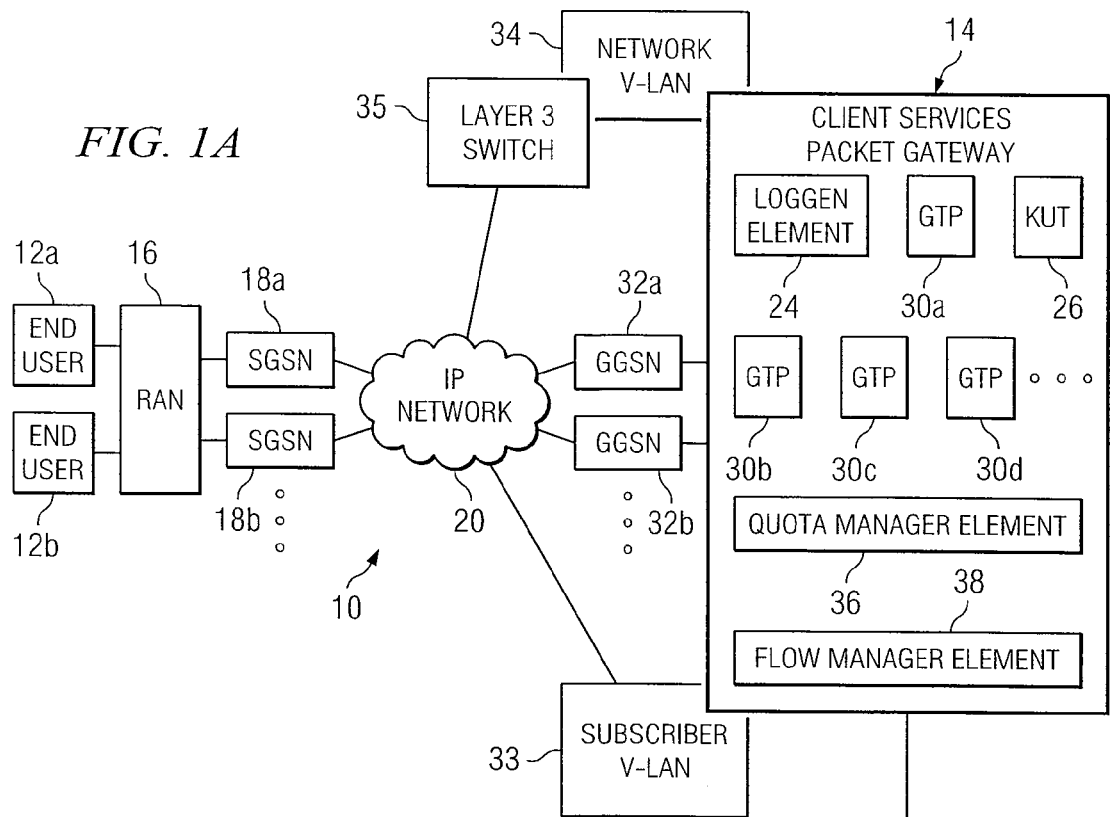
FIG. 1A illustrates an example system for billing end users in a peer-to-peer transaction.
FIG. 1B illustrates a simplified block diagram of a known user table (KUT) included within the communication system.

In one embodiment, a method for billing end users in a peer-to-peer transaction in a network environment is provided that includes a client services packet gateway operable to communicate with a first end user and a second end user in order to facilitate the peer-to-peer transaction and a flow manager element operable to receive one or more packets of the peer-to-peer transaction from one or more interfaces, such that the interface is a subscriber interface or a network interface. The flow manager is further operable to associate a first session object with the first user and associate a second session object with the second user.

In another embodiment, a method includes billing end users in a peer-to-peer transaction in a network environment includes associating the one or more packets of the peer-to-peer transaction to the first session object and associating the one or more packets of the peer-to-peer transaction to the second session object. The method further includes generating a first billing record from the first session object, such that the first billing record is associated with the first end user, and generating a second billing record from the second session object, such that the second billing record is associated with the second end user. The method further includes routing the packet to create a new flow. The method can perform next-hop routing, wherein the packet is routed to a L3 switch or a router and routed back to a Client Services Packet Gateway. Additionally, the method can perform internal routing, without traversing a layer three network, to a processor.

Important technical advantages of certain embodiments include increasing revenue associated by properly billing each subscriber involved in a peer-to-peer transaction that is processed by a single billing gateway. Additionally, certain embodiments include consistently billing each subscriber in a peer-to-peer transaction when each of the subscribers is being serviced by a separate billing device. Additionally, certain embodiments are especially efficient and quick for processing packets in a peer-to-peer transaction in a billing gateway implemented with a multiprocessor architecture. Separate processors can be associated for processing different sessions and subscribers independently.

Other important technical advantages of certain embodiments include not requiring a search of a second IP address within a packet if the first IP address search fails. Therefore, only a single query of an external database is needed instead of two queries or serialized queries if neither IP address is in the subscriber database. This allows for quicker and more efficient processing of the packets since only one query is made.

Other technical advantages of embodiments of the present disclosure will be readily apparent to one skilled in the art from the following figures, descriptions, and claims. Moreover, while specific advantages have been enumerated above, various embodiments may include all, some, or none of the enumerated advantages.

Description

FIG. 1A is a simplified block diagram of a communication system 10 for associating an end user for billing and for billing end users in a peer-to-peer transaction in a network environment. Communication system 10 includes an end user 12*a-b*, a client services packet gateway 14, a radio access network (RAN) 16, multiple serving general packet radio service (GPRS) support node (SGSN) 18*a* and 18*b*, and an internet protocol (IP) network 20. Additionally, communication system 10 includes multiple gateway GPRS support nodes (GGSNs) 32*a-b*, a subscriber virtual LAN 33, a network virtual LAN 34, and a Layer 3 switch 35. Client services packet gateway 14 may include a loggen element 24, a known user table (KUT) 26, multiple GPRS tunneling protocol (GTP) communications protocol elements 30*a-d* that facilitate communications between client services packet gateway 14 and any billing entity within communication system 10, a quota manager element 36, and flow manager element 38. Communication system 10 may additionally include a billing system element 40 that may include a quota server 42 and a billing mediation agent (BMA) 44. Billing system element 40 may also include a price server 50 and an advice of charge server 60.

FIG. 1A may be generally configured or arranged to represent a 2.5 G communication architecture applicable to a Global System for Mobile (GSM) environment in accordance with a particular embodiment of the present disclosure. However, the 2.5 G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that could benefit from a billing function being provided for any network element. This may be inclusive of first generation, 2G, and 3G architectures that provide features and services for any end user 12. Moreover, communication system 10 could be applied to any access network/protocol that allows end user 12 to create sub-connections, which specify differential treatment for packets in those connections. Furthermore, the relaying of such information into one or more client services packet gateway 14 elements could be implemented in any such network/access technology.

According to the illustrated embodiment, system 10 provides services such as communication sessions to endpoints such as end user 20. A communication session refers to an active communication between endpoints. Information may be communicated during a communication session. Information may include voice, data, text, audio, video, multimedia, control, signaling, and/or other information. Information may be communicated in packets, each comprising a bundle of data organized in a specific way for transmission. Each session can have a session key. The session key can include TCP or UDP port information, IP protocol information, such as TCP or UDP, and virtual routing and forwarding (VRF) information. A session object may track data associated with a particular session. A session object may be a data structure, such that the data structure is a logical organization of a collection of data in computer memory.

In accordance with the teachings of the present disclosure, communication system 10 operates to efficiently and accurately associate an IP packet to a subscriber based on the IP address in the packet and the configuration of the ingress interface or virtual LAN. Client services packet gateway 14 may parse IP packets transmitted between a user and a server or between a user and another user (or any other suitable destination). Each packet arrives on a virtual LAN and each packet contains a source IP address and a destination IP address. Client services packet gateway 14 may quickly identify whether to use the source IP address or the destination IP address to associate with a subscriber to bill depending on which virtual LAN or interface the packet arrives from. If the packet is ingress from a subscriber virtual LAN or a subscriber interface, then client services packet gateway 14 will associate the subscriber with the source IP address of the packet. If the packet is ingress from a network virtual LAN or a network interface, then client services packet gateway 14 will associate the subscriber with the destination IP address of the packet. The IP address selected based on the interface or virtual LAN configuration can be used to determine an identity (or profile) of end user 12 that may be stored in end user database. For selected flows and for selected clients, billing system element 40 debits an end user account based on the type and quantity of information being transmitted. In a general sense, client services packet gateway 14 may cooperate with billing system element 40 in order to charge end user 12 based on a particular event, content, or communication flow.

Additionally, communication system 10 operates to accurately bill subscribers involved in a peer-to-peer transaction that share a single billing gateway. Client services packet gateway 14 can use peer-to-peer content rules to use next-hop, reverse next-hop, or internal client services packet gateway routing configurations for packets based on if the IP packet is received via a subscriber interface or a network interface. Client services packet gateway 14 may be configured with next-hop commands to forward a packet or packet flow involving a peer-to-peer transaction that is received from a subscriber virtual LAN or interface to a L3 switch or router. Alternatively, client services packet gateway 14 may be configured to internally forward a packet or a packet flow of a peer-to-peer transaction that is received from a subscriber virtual LAN or interface. Client services packet gateway 14 may create a session or flow associated with the source IP address of packet, such as end user 12a, if packet or packet flow is received via subscriber virtual LAN or interface. Normal network routing of the packet or packet flow is overridden by the next-hop configuration of forwarding the packet or packet flow to L3 switch or router. L3 switch or router can forward packet or packet flow back to client services packet gateway 14 on a virtual LAN configured as a network virtual LAN. Since packet or packet flow is received via a network virtual LAN or interface, client services packet gateway 14 may create a new session associated with the destination IP address of the packet, such as end user 12b. Normal network routing of the packet or packet flow continues since the packet or packet flow was received via a network virtual LAN or interface. At this point, client services packet gateway 14 has created two flows each associated with an end user, such that both end users are charged for the peer-to-peer transaction.

For purposes of teaching and discussion, it is useful to provide some overview as to the way in which the following disclosure operates. The following foundational information may be viewed as a basis from which the present disclosure may be properly explained. Such information is offered earnestly for purposes of explanation and discussion only and, accordingly, should not be construed in any way to limit the broad scope of the present disclosure and it potential applications.

Generally, a billing gateway provides charging services for subscriber transactions. When the subscriber communicates with a network server for the transaction, the subscriber incurs a charge associated with the use of network resources and/or the value of the retrieved content.

When the subscriber communicates with another subscriber in a peer-to-peer transaction, both subscribers are using network resources to process the transaction. Network service providers want to charge each subscriber involved in the peer-to-peer transaction because each subscriber is utilizing network resources. Billing both subscribers is especially important in a mobile wireless network because each subscriber is consuming wireless bandwidth.

Normally, if separate billing gateways handle charging each subscriber separately in a peer-to-peer transaction, then each subscriber is properly billed. However, if a single billing gateway handles charging both subscribers in a peer-to-peer transaction, then the transaction may only be billed to a certain subscriber. As a result, this results in lost revenue for network service providers and may create billing inconsistencies when billing subscribers. The flow manager element, discussed below in more detail, solves this problem by allowing a single billing gateway to properly and consistently charge each subscriber in a peer-to-peer transaction.

Normally, when a billing gateway processes IP packets, the billing gateway associates the IP packet with a subscriber to apply charging policies or other policies, such as QoS, to the IP packet. The billing gateway will associate an IP packet with a subscriber to charge who is in the billing gateway's table of subscribers. The billing gateway may use the source IP address or the destination IP address of the IP packet to search its subscriber table to bill the correct subscriber. The flow manager element, discussed below in more detail, uses a simple and fast algorithm to determine if the source IP address or destination IP address of the IP packet should be used for searching the subscriber table.

Referring back to FIG. 1, an end user [either 12a or 12b] is a client, customer, subscriber, entity, source, or object seeking to initiate network communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of packet, numeric, voice, video, audio-visual, or script data, or any type of source or object code, or any other suitable information in any appropriate format that may be communicated from one point to another.

RAN 16 is a communications interface between end user 12 and SGSNs 18a and 18b. RAN 16 may comprise a base transceiver station and a base station controller in one embodiment. The communications interface provided by RAN 16 offers connectivity and allows data to be exchanged between end user 12 and any number of selected elements within communication system 10. RAN 16 facilitates the delivery of a request packet generated by end user 12 and the reception of information sought by end user 12. RAN 16 is only one example of a communications interface between end user 12 and SGSNs 18a and 18b. Other types of communications interfaces may be used for a desired network design based on particular needs.

SGSNs 18a and 18b and GGSNs 32a and 32b are communication nodes or elements that cooperate in order to facilitate a communication session involving end user 12. GGSNs 32a-b are communications nodes operating in a GPRS environment that may be working in conjunction with multiple SGSNs 18a and 18b to provide a communications medium in a GPRS service network. GGSNs 32a and 32b may be inclusive of a walled garden (providing a security or an access functionality to communication system 10) or any other suitable mechanism that a network operator may choose to implement in providing some connectivity for a network. GPRS represents a packet-based data bearer service for communication services that may be delivered as a network overlay for any type of suitable network configuration or platform. GPRS may support multiple internet communication protocols and may enable existing IP, point to point protocol (PPP), or any other suitable applications or platforms to operate over a given network.

IP network 20 represents a series of points or nodes of interconnected communication paths for receiving and transmitting packets of information that propagate through communication system 10. IP network 20 offers a communicative interface between end user 12 and selected GGSNs 32a-b and may be any local area network (LAN), wireless local area network (WLAN), metropolitan area network (MAN), wide area network (WAN), virtual private network (VPN), or any other appropriate architecture or system that facilitates communications in a network environment. IP network 20 may implement a user datagram protocol (UDP)/internet protocol (UDP/IP) connection and use a transmission control protocol (TCP/IP) communication language protocol in particular embodiments of the present disclosure. However, IP network 20 may alternatively implement any other suitable communication protocol for transmitting and receiving data or information within communication system 10.

Subscriber virtual LAN (VLAN) 33 represents a VLAN configured by a network administrator or operator to be marked as a subscriber VLAN 33. Network VLAN 34 represents a VLAN configured by a network administrator or operator to be marked as a network VLAN 34. Generally, a VLAN 33, 34 consists of a network of computers that behave as if they were connected by the same wire. Both the subscriber VLAN 33 and network VLAN 34 are connected to client services packet gateway 14 across the network. Client services packet gateway 14 may have one or more virtual interfaces and potentially thousands of virtual interfaces to communicate with subscriber VLAN 33 and network VLAN 34. Alternatively, network administrator or operator can configure interfaces coupled to VLAN to be subscriber interface or network interface. Interface may be a physical or logical interface.

For purposes of example and explanation only, a VLAN may be a Layer-2 broadcast domain. In one particular embodiment, a mobile gateway, such as GGSN, may put the correct VLAN marking on a subscriber packet, such that subscriber packet will be on the correct VLAN. Mobile gateway may select that VLAN tag based on the next-hop for routing the packet. The selection of next-hop may be based solely on routing tables or the selection of next-hop may be based on information provided by the mobile device. For example, a packet traversing a Layer-3 switch before arriving at client services packet gateway may use routing tables to determine next-hop. The next-hop may reside on a VLAN so the VLAN would be determined by routing.

L3 switch 35 can represent a switch operable to receive a packet that is next-hop routed from client services packet gateway 14 and return the packet to client services packet gateway 14. The packet returned to client services packet gateway 14 will be via a network virtual LAN, such that a new flow is created. Alternatively L3 switch can be a router.

Client services packet gateway 14 represents a generic piece of network equipment that can facilitate some type of accounting service for communication system 10. Client services packet gateway 14 could be a wireless application protocol (WAP) gateway, a compression and/or optimization engine, a billing engine (inclusive of per-content billing), a service enforcement element, a content authorization component, a policy enforcement gateway, or any other element that is operable to modify, process, or transform data or information in a network environment. This may be inclusive of simple routers, switches, loadbalancers, gateways, bridges, or any other piece of network equipment where appropriate and based on particular needs. Client services packet gateway 14 represents any component, device, element, or object that can benefit from having suitable signaling information provided to it such that appropriate billing may be achieved.

As described above, client services packet gateway 14 utilizes the identity of the client or the end user to provide services based on a source profile. In a particular embodiment of the present disclosure, client services packet gateway 14 provides client-aware services by operating at networking layers two and three. Accordingly, the information available at networking layers two and three provides a basis for the identification of an end user or a client. Client services packet gateway 14 may use an IP address or any other suitable parameter to uniquely identify a client or an end user in offering a service, enhanced capability, or feature to an end user. Client services packet gateway 14 may include any suitable hardware, software, components, or elements that identify a unique identifier in order to provide some networking feature or capability to an end user.

In operation of an example embodiment, client services packet gateway 14 may efficiently extract information from a packet or a packet flow to associate with end user. Each packet arrives on a VLAN and each packet contains a source IP address and a destination IP address. Client services packet gateway 14 may quickly identify whether to use the source IP address or the destination IP address depending on which VLAN or interface the packet arrives from. If the packet is ingress from a subscriber VLAN or a subscriber interface, then client services packet gateway 14 will associate the subscriber with the source IP address of the packet. If the packet is ingress from a network VLAN or a network interface, then client services packet gateway 14 will associate the subscriber with the destination IP address of the packet. The IP address selected based on the interface or VLAN configuration may be used to determine an identity (or profile) of end user 12 that may be stored in KUT 26. This operation removes ambiguous logic having to search a destination IP address to associate with an end user stored in KUT if a source IP address is not associated with an end user stored in KUT. Therefore, transactions, such as streaming data or FTP, are processed faster. Alternatively, client services packet gateway 14 may extract or identify any information within the data flow that provides a correlation between end user 12 and a given data flow. In another embodiment, client services packet gateway 14 may search an external subscriber database using source IP address if the packet is received on a subscriber interface or destination IP address if the packet is received on a network interface. By knowing which IP address to use based on the interface configuration, only one query to the external database is required.

In one particular embodiment, client services packet gateway 14 may have a multiprocessor architecture that associates each subscriber IP address to a particular processor. For example, data associated with subscriber 1, such as session object, user object, and prepaid billing information, can reside on a processor, and data associated with subscriber 2 can reside on a separate processor. Client services packet gateway 14 may determine the processor that each received packet is forwarded to. If packet is received on a subscriber interface, then client services packet gateway 14 will use the source IP address to determine what processor to forward the packet. If packet is received on a network interface, then client services packet gateway 14 will use the network IP address to determine what processor to forward the packet. It is important that the packet goes to same processor each time because each processor knows information relating to the session or packet flow as well as the subscriber. This allows transactions to process faster because processors do not have to communicate with other processors to determine the user identity, how much quota user has remaining, the characteristics of the HTTP session, etcetera.

In a peer-to-peer transaction, client services packet gateway 14 may create a separate session object for each end user, such that a new flow or session is created for each end user involved a peer-to-peer transaction. For example, in a peer-to-peer transaction involving end user 12a and end user 12b, two flows or sessions will be created. Flow for end user 12a to end user 12b can be charged to end user 12a. Flow for end user 12b to end user 12a can be charged to end user 12b. By creating a new flow or session for each end user in a peer-to-peer transaction, client services packet gateway 14 prevents situations where only one end user is charged for a peer-to-peer transaction. As a result, service providers receive more revenue, and end users receive more consistent billing.

Client services packet gateway 14 may force the creation of multiple end user sessions by utilizing peer-to-peer content rules. For example, client services packet gateway 14 may use peer-to-peer content rules to use next-hop or reverse next-hop, or internal client services packet gateway 14 routing configurations for packets based on if the IP packet is received via a subscriber interface or a network interface. In one particular embodiment, client services packet gateway 14 may be configured with next-hop commands to forward a packet or packet flow involving a peer-to-peer transaction that is received from a subscriber VLAN or interface to a L3 switch or router. Client services packet gateway 14 will create a session or flow associated with the source IP address of packet, such as end user 12a, if packet or packet flow is received via subscriber VLAN or interface. Normal network routing of the packet or packet flow is overridden by the next-hop configuration of forwarding the packet or packet flow to L3 switch or router. L3 switch or router can forward packet or packet flow back to client services packet gateway 14 on a VLAN configured as a network VLAN. Since packet or packet flow is received via a network VLAN or interface, client services packet gateway 14 may create a new session associated with the destination IP address of the packet, such as end user 12b. Normal network routing of the packet or packet flow continues since the packet or packet flow was received via a network VLAN or interface. At this point, client services packet gateway 14 has created two flows each associated with an end user, such that both end users are charged for the peer-to-peer transaction. This technique is particularly beneficial for client services packet gateway 14 that implements a multiprocessor architecture because different processors can independently process the two sessions and the two subscribers associated with the peer-to-peer transaction.

In an alternative embodiment, client services packet gateway 14 may be configured to internally loop a packet or packet flow received via subscriber VLAN or interface. Normal network routing of the packet or packet flow is overridden by internally forwarding the packet or packet flow to client services packet gateway 14. Software or logic of client services packet gateway 14, such as flow manager element 38 discussed below, can make the packet or packet flow that is internally forwarded to appear as if packet or packet flow is received via a network VLAN or interface. Since packet or packet flow appears to be received via a network VLAN or interface, client services packet gateway 14 may create a new session associated with the destination IP address of the packet. In one particular embodiment, client services packet gateway 14 may forward packet or packet flow internally from one processor to another, such that each processor is associated with a particular session or flow. Client services packet gateway 14 may create two sessions each associated with an end user, such that both end users are charged for the peer-to-peer transaction. This technique is particularly beneficial for client services packet gateway 14 that implements a multiprocessor architecture because different processors can independently process the two sessions and the two subscribers associated with the peer-to-peer transaction.

Client services packet gateway 14 may also be a client-aware device that provides or offers some service or feature to end user 12. Such services may be based on an effective mapping between a source IP address or a destination IP address of a given address packet and a user profile or information associated with end user 12. Client services packet gateway 14 may include a RADIUS component that may receive RADIUS updates and parse the updates. In addition, client services packet gateway 14 may execute some action based on the RADIUS updates it receives. Client services packet gateway 14 may be provided with accounting, authorization and authentication (AAA) capabilities where appropriate. Alternatively, these capabilities may be provided external to client services packet gateway 14, for example, in an AAA server.

There are other reasons why a device or a component may seek to identify the source (end user 12) associated with a communication session or data flow. For example, some devices may wish to identify end user 12 for authorization purposes. In another example, a device may wish to maintain user profiles for billing or accounting records (for example, in conjunction with per-user accounting) or to provide for content billing information. Alternatively, a device or a component may use the identification of end user 12 to provide for any other type of suitable client-aware service, tool, or feature according to the particular needs of network operators. Additional services may be related to areas such as routing, permissions or access-granting mechanisms, priority, quality of service (QoS), firewalling, content filtering, or any other suitable parameters or policies where user-aware characteristics serve as a basis for a network service implementation.

In an example scenario, end user 12 may have a communication session established with SGSN 18*a* where a certain amount of money from an account of end user 12 is translated into a download of a given number of bytes. When end user 12 moves to SGSN 18*b*, end user 12 may be permitted to download a different number of designated bytes for the same amount of money or billing rate. The SGSN change may be detected by GGSN 32*a* or 32*b* whereby the selected GGSN communicates an accounting update to client services packet gateway 14. Client services packet gateway 14 may then return all downloaded quota for end user 12 and notify billing system element 40 of the change in SGSN. Client services packet gateway 14 may also communicate an acknowledgement to the selected GGSN for the message provided thereto. Client services packet gateway 14 may then download the appropriate quota information for end user 12 again. This information may be retrieved from quota server 42 or alternatively from any other suitable database or storage element provided within billing system element 40 or provided external thereto. Billing system element 40 may be aware of the location change and send quota information to client services packet gateway 14 based on new financial parameters or new tariff characteristics that apply to the new location or the change in network parameters.

Client services packet gateway 14 may be inserted into a data flow that may view, extract, identify, access, or otherwise monitor information included within the data flow. Client services packet gateway 14 may handle the enforcement of access, quota distribution, and accounting that is provided by the information retrieved from elements included within billing system element 40. Client services packet gateway 14 may generally deduct quota after it has been properly allocated and, subsequently, retrieve additional quota when that quota allocation has been consumed. In a general sense, client services packet gateway 14 may be responsible for quota enforcement for end user 12.

Loggen element 24 is a storage element operable to build billing records and communicate the billing records to BMA 44 based on information provided by KUT 26. Even in cases where the information returned by KUT 26 reflects a null (e.g., no active BMA), this may be communicated to GTP element 30*a*, which may use the value to determine the destination and queue(s) to use or to invoke for a corresponding billing record. Loggen element 24 may also operate to store data for later use and execute all formatting for billing records to be communicated to BMA 44. Loggen element 24 may be implemented using hardware, software, or any other suitable element or object operable to store information and to generate a billing record to be communicated to BMA 44. Loggen element 24 may communicate with BMA 44 in order to log quota usage data associated with end user 12. Loggen element 24 may generate logging records or billing records and additionally send messages to billing system element 40 associated with a change in SGSN.

KUT 26 is a data storage element that manages one or more correlations between the ID of end user 12 and a corresponding IP address. KUT 26 may also store information relating to BMA 44, previously designated to end user 12, and BMA 44 may be invoked when additional information associated with end user 12 is communicated to client services packet gateway 14. KUT 26 may be consulted as additional billing records are created in order to determine that BMA 44 should receive selected billing records. KUT 26 may also include an application program interface (API) that may be implemented in order to obtain user ID information for an IP address from a data flow.

Client services packet gateway 14 and billing system element 40 may implement any suitable communications protocol in order to exchange information. In an example embodiment, GTP elements 30*a-d* may be used as a communications protocol or platform for such communications. Alternatively, client services packet gateway 14 and billing system element 40 (or BMA 44) may implement any communications protocol or tunneling communication link in order to provide for a suitable data exchange. GTP elements 30*a-d* may be included in client services packet gateway 14 or provided external thereto and be GTP or non-GTP based where appropriate. In one embodiment, GTP elements 30*a-d* are software communication protocols that describe the acknowledgement (or ACKing) and handshaking operations that may allow recognition of active, operational, and disabled states associated with BMA 44. In addition, GTP elements 30*a-d* may facilitate the formatting, header information, sequencing, and other communication parameters in order to effectively deliver data or information between client services packet gateway 14 and BMA 44.

A billing record may then be created within client services packet gateway 14 and sent to BMA 44. A look-up operation may then be performed in order to correlate the IP address of end user 12 in KUT 26 to the user ID that may be included in that billing record. With this information provided, BMA 44 may now be assigned for this end user (if end user 12 is a new user). If this information or data flow is associated with an existing end user 12, it may be determined that BMA 44 was previously used by end user 12.

Quota manager element 36 is an element that manages quota information for services subscribed to by end user 12. Quota manager element 36 also provides an interface between GGSNs 32*a* and 32*b* and billing system element 40. Quota manager element 36 may also communicate with billing system element 40 in order to exchange information associated with charging for end user 12. Quota manager element 36 may also receive RADIUS updates from GGSN 32*a* or 32*b* that reflect the current status associated with end user 12.

Flow manager element 38 is an object that manages associating an end user to a packet or packet flow. Flow manager associates a packet or packet flow received via a subscriber VLAN or interface with an end user based on the packet's source IP address, and associates a packet or packet flow received via a network VLAN or interface with an end user based on the packet's destination IP address. In a peer-to-peer transaction, flow manager element can create separate session objects for each end user, such that a separate billing record is created for each session object. In one particular embodiment, flow manager element can force the creation of multiple end user sessions. For example, flow manager element 38 can use peer-to-peer content rules to use next-hop, reverse next-hop, or internal client services packet gateway routing configurations for packets depending on if the IP packet is received via a subscriber interface or a network interface. In one particular embodiment, client services packet gateway 14 may be configured with next-hop commands to forward a packet or packet flow involving a peer-to-peer transaction that is received from a subscriber VLAN or interface to a L3 switch or router. In an alternative embodiment, client services packet gateway 14 may forward packet or packet flow internally from one processor to another, such that each processor is associated with a particular session or flow. The operations and processes associated with the elements included within flow manager element 38 are described below with reference to FIGS. 2A-2C.

It is critical to note that client services packet gateway 14 and flow manager element 38 may include any suitable elements, hardware, software, objects, or components capable of effectuating their operations or additional operations where appropriate. Additionally, any one or more of the elements included in client services packet gateway 14 and flow manager element 38 may be provided in an external structure or combined into a single module or device where appropriate. Moreover, any of the functions provided by these two elements may be offered in a single unit or single functionalities may be arbitrarily swapped between client services packet gateway 14 and flow manager element 38. The embodiment offered in FIG. 1A has been provided for purposes of example only. The arrangement of elements (and their associated operation(s)) may be reconfigured significantly in any other appropriate manner in accordance with the teachings of the present disclosure.

Billing system element 40 is an object that manages the billing and access policies associated with a given end user 12. In one embodiment, billing system element 40 includes quota server 42, BMA 44, price server 50, and advice of charge server 60. Client services packet gateway 14 may communicate with billing system element 40 in order to retrieve information or learn of billing policies for end user 12. FIG. 1B is a simplified block diagram of KUT 26 included within communication system 10. KUT 26 may operate to manage or correlate user ID information with IP address data from a given communication or data flow. A number of entries may be included within KUT 26 that execute this correlation. For example, an entry may be provided as key address '1.1.1.1' with a data field in a first segment that defines BMA 44 (data field #1) and a data field in a second segment that identifies a user ID for that IP address as some person or entity (data field #2). This is illustrated by the 'John Smith' entry in FIG. 2.

KUT 26 may also identify or store current SGSN information (data field #3) for end user 12 in a third segment. KUT 26 may receive RADIUS updates and maintain an end user's IP address and new SGSN that is being used. KUT 26 may be accessed in order to indicate that end user 12 has an IP address of 1.1.1.1. Such an address may correspond to 'John Smith' and an identifier of SGSN #1 (e.g. its IP address) or that 'John Smith' is now engaging SGSN #2 (reflected by its identifier, e.g. its IP address). KUT 26 has the capability of recognizing old and new SGSNs and may further add a capability to recognize changes therewith.

In operation, KUT 26 may return a given BMA 44 to use as the destination for all billing records for a particular session, data flow, or end user 12 in accordance with one or more of the following example guidelines. If an element with an already known user ID exists in KUT 26 and corresponds to any requested IP address, the identification (IP address) of the selected BMA 44 may be forwarded from KUT 26 to the caller entity. Where requested elements with user IDs exist, the selected BMA 44 for a first IP request may be returned.

If neither IP address has a corresponding element in KUT 26, KUT 26 may notify loggen element 24 that no user ID is present in the table. When loggen element 24 determines that no user ID information will be obtained, it may communicate with KUT 26 and deliver source and destination IP addresses in order to assign BMA 44. KUT 26 may also operate to accurately recall the IP address associated with an identification correlating to end user 12. In an example scenario, client services packet gateway 14 may not know the identity of end user 12 and therefore an IP source address or some other user-identifying data is needed. The IP address may be dynamically assigned when an associated device is activated, e.g., a cellular telephone is turned on. The IP address may be assigned by any suitable element such as GGSN 32a or 32b, for example. Alternatively, an IP source address may be assigned or designated in any other suitable manner. KUT 26 may now be implemented to retrieve the user ID name associated with the IP address correlating to end user 12. This information may be positioned in a billing record that may be used to create a bill for a given end user 12. This may also be used (for example) to track information such as how many bytes were uploaded by end user 12 (byte counts) or how many URL addresses were accessed (or which URL addresses were accessed) by a given end user 12.

KUT 26 is thus provided with the capability of mapping the source IP address (or any other end user 12 parameter) to a user ID. The user ID may be obtained from an external database where appropriate or any other suitable location. Alternatively, the user ID may be extracted from a RADIUS flow, a terminal access controller access control system (TACACS) communications flow, a diameter communications flow, or any other suitable communications protocol flow, communication session, or data exchange. The database may be populated at any suitable time and updated using any suitable mechanism, such as via the sniffing of RADIUS or TACACS flows.

FIG. 2A illustrates an example method for billing end users in a peer-to-peer transaction. The flowchart may begin at step 100 where end user or subscriber sends packet or packet flow destined for www.xyz.com. At step 102, packet or packet flow arrives at client services packet gateway via a virtual LAN or interface that has been configured as a subscriber VLAN or a subscriber interface. At step 104, client services packet gateway associates a subscriber with the packet or packet flow based on how the VLAN or interface is configured. Since packet or packet flow is received via a subscriber VLAN or interface, then client services packet gateway associates subscriber with the source IP address of the packet. Client services packet gateway may obtain subscriber's information by looking up the packet's source IP address in KUT table or an external database.

At step 106, client services packet gateway creates a session object associated with subscriber. At step 108, client services packet gateway performs normal billing processing associated with subscriber's session, such as associating the session with a billing plan, communicating with quota server, receiving quota, etcetera. At step 110, client services packet gateway forwards packet or packet flow to www.xyz.com server via a VLAN or interface configured as a network VLAN or a network interface. At step 112, www.xyz.com server receives the packet or packet flow and sends a new packet or packet flow destined for subscriber.

At step 114, packet or packet flow from www.xyz.com arrives at client services packet gateway via network VLAN or network interface. At step 116, since packet or packet flow is received via a network VLAN or interface, then client services packet gateway associates subscriber with the destination IP address of the packet. Client services packet gateway may associate the packet or packet flow with subscriber's current session by the packet's destination IP address. At step 118, client services packet gateway performs normal billing processing associated with subscriber's session. At step 120, client services packet gateway forwards packet or packet flow from www.xyz.com to subscriber.

FIG. 2B illustrates another example method for billing end users in a peer-to-peer transaction. The flowchart may begin at step 200 where subscriber 12a (subscriber 1) initiates a transaction with subscriber 12b (subscriber 2) by sending a packet (packet 1). At step 202, since packet 1 is received via a VLAN or interface configured as subscriber VLAN or subscriber interface, client services packet gateway creates a session object (session 1) associated with subscriber IP address being the source IP address of subscriber 1, and the network IP address being the destination IP address of subscriber 2. All billing associated with session 1 is charged to subscriber 1.

At step 204, client services packet gateway is configured to use next-hop routing for packets if the IP packet is received via a subscriber interface or a subscriber VLAN. Since packet is received on subscriber interface, client services packet gateway overrides normal network routing and forwards the peer-to-peer packet or packet flow to an L3 switch or router. At step 206, L3 switch or router receives packet 1 and forwards packet 1 destined for subscriber 2 back to client services packet gateway via a VLAN or interface configured as a network VLAN or a network interface.

At step 208, since packet 1 is received via a VLAN or interface configured as network VLAN or network interface, client services packet gateway creates a session object (session 2) because no session is associated with subscriber IP address being the destination IP address of subscriber 2, and the network IP address being the source IP address of subscriber 1. All billing associated with session 2 is charged to subscriber 2. At this point, two session objects have been created that are part of the same transaction. Packet 1 has been charged to both subscriber 1 and subscriber 2. If client services packet gateway is implemented as a multiprocessor architecture, then a particular processor can process each session independently. If client services packet gateway is implemented with a single processor, then a single processor can process both sessions. At step 210, client services packet gateway forwards packet 1 to subscriber 2 in accordance to routing tables.

At step 212, subscriber 2 receives packet 1 and sends packet 2 destined for subscriber 1 via subscriber configured VLAN. At step 214, since packet 2 is received via a VLAN or interface configured as subscriber VLAN or subscriber interface, client services packet gateway associates packet 2 with session 2 because subscriber IP address is the source IP address of subscriber 2, and the network IP address is the destination IP address of subscriber 1. All billing associated with session 2 is charged to subscriber 2. At step 216, since packet 2 is received on subscriber interface, client services packet gateway overrides normal network routing and forwards the peer-to-peer packet or packet flow to an L3 switch or router, based on next-hop routing configuration. At step 218, L3 switch or router receives packet 2 and forwards packet 2 destined for subscriber 1 back to client services packet gateway via a VLAN or interface configured as a network VLAN or a network interface.

At step 220, since packet 2 is received via a VLAN or interface configured as network VLAN or network interface, client services packet gateway associates packet 2 with session 1 because subscriber IP address is the destination IP address of subscriber 1, and the network IP address is the source IP address of subscriber 2. All billing associated with session 1 is charged to subscriber 1. At this point, two session objects continue to associate packets to subscriber 1 and subscriber 2 for the peer-to-peer transaction. Packet 1 and packet 2 have been charged to both subscriber 1 and subscriber 2.

FIG. 2C illustrates another example method for billing end users in a peer-to-peer transaction. The flowchart may begin at step 300 where subscriber 12a (subscriber 1) initiates a transaction with subscriber 12b (subscriber 2) by sending a packet (packet 1). At step 302, since packet 1 is received via a VLAN or interface configured as subscriber VLAN or subscriber interface, client services packet gateway creates a session object (session 1) associated with subscriber IP address being the source IP address of subscriber 1, and the network IP address being the destination IP address of subscriber 2. All billing associated with session 1 is charged to subscriber 1. If client services packet gateway is implemented as a multiprocessor architecture, then a particular processor can process each session independently. Processor 1 may be associated with session 1.

At step 304, client services packet gateway is configured to use internal client services packet gateway routing for packets if the IP packet is received via a subscriber interface or a subscriber VLAN. Since packet is received on subscriber interface, client services packet gateway overrides normal network routing and forwards the peer-to-peer packet or packet flow internally to another processor in client services packet gateway. At step 306, client services packet gateway may make packet 1 appear as if packet 1 is received via a network VLAN or interface while packet 1 is internally forwarded.

At step 308, since packet 1 appears to be received via a VLAN or interface configured as network VLAN or network interface, client services packet gateway creates a session object (session 2) because no session is associated with subscriber IP address being the destination IP address of subscriber 2, and the network IP address being the source IP address of subscriber 1. All billing associated with session 2 is charged to subscriber 2. Processor 2 may be associated with session 2. At this point, two session objects have been created that are part of the same transaction. Packet 1 has been charged to both subscriber 1 and subscriber 2. At step 310, client services packet gateway forwards packet 1 to subscriber 2 in accordance to routing tables.

At step 312, subscriber 2 receives packet 1 and sends packet 2 destined for subscriber 1 via subscriber configured VLAN. At step 314, since packet 2 is received via a VLAN or interface configured as subscriber VLAN or subscriber interface, client services packet gateway associates packet 2 with session 2 because subscriber IP address is the source IP address of subscriber 2, and the network IP address is the destination IP address of subscriber 1. All billing associated with session 2 is charged to subscriber 2. At step 316, since packet 2 is received on subscriber interface, client services packet gateway overrides normal network routing and forwards the peer-to-peer packet or packet flow internally from processor 2 to processor 1. At step 318, client services packet gateway can make packet 2 appear as if packet 2 is received via a network VLAN or interface while packet 2 is internally switched.

At step 320, since packet 2 appears to be received via a VLAN or interface configured as network VLAN or network interface, client services packet gateway associates packet 2 with session 1 because subscriber IP address is the destination IP address of subscriber 1, and the network IP address is the source IP address of subscriber 2. All billing associated with session 1 is charged to subscriber 1. Processor 1 may be associated with session 1. At this point, two session objects continue to associate packets to subscriber 1 and subscriber 2 for the peer-to-peer transaction. Packet 1 and packet 2 have been charged to both subscriber 1 and subscriber 2.

Some of the steps illustrated in FIGS. 2A-C may be changed or deleted where appropriate and additional steps may also be added to the flowcharts. These changes may be based on specific communication architectures or particular interfacing arrangements and configurations of associated elements and do not depart from the scope or the teachings of the present disclosure. The interactions and operations of the elements within billing system element 40 and client services packet gateway 14, as disclosed in FIGS. 2A-C, have provided merely one example for their potential applications. Numerous other applications may be equally beneficial and selected based on particular networking needs.

Although the present disclosure has been described in detail with reference to particular embodiments, communication system 10 may be extended to any scenario in which end user 12 is provided with a service in the context of a wired or a wireless connection or coupling. This may also be extended to any other network architectures and include communications with some type of access server (e.g. a network access server (NAS), foreign agents, etc.). End user 12 may use a dedicated connection of some form or use forms of multiple access protocols where appropriate. Access may be associated with a PPP architecture or alternatively with layer three protocols over a layer two in accordance with particular needs. Moreover, significant flexibility is provided by communication system 10 in that any suitable one or more components may be replaced with other components that facilitate their operations. For example, RAN 16 and SGSNs 18a and 18b may be replaced by an access network or by a packet data serving node (PDSN). Additionally, GGSNs 32a and 32b may be replaced by a home agent or a NAS where appropriate.

Additionally, although communication system 10 has been described with reference to a number of elements included within client services packet gateway 14 and billing system element 40, these elements may be rearranged or positioned anywhere within communication system 10. In addition, these elements may be provided as separate external components to communication system 10 where appropriate. The present disclosure contemplates great flexibility in the arrangement of these elements as well as their internal components. For example, in an alternative embodiment client services packet gateway 14 may include billing system element 40 or BMA 44 or these elements may be provided in a single module. Moreover, although FIGS. 1 and 2 illustrate an arrangement of selected elements, such as client services packet gateway 14 inclusive of quota manager element 36, loggen element 24, or GTP elements 30a-d, numerous other components may be used in combination with these elements or substituted for these elements without departing from the teachings of the present disclosure. Additionally, client services packet gateway 14 may be positioned in any suitable point of a data flow such that it may extract information used for generating a billing record.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus, comprising:
a client services packet gateway operable to communicate with a first end user and a second end user in order to facilitate a peer-to-peer transaction; and
a flow manager element operable to:
receive one or more packets of the peer-to-peer transaction from one or more interfaces, wherein an interface is a subscriber interface or a network interface;
if a selected packet is received from the subscriber interface:
associate a first source Internet Protocol (IP) address corresponding to the first user and a second destination IP address corresponding to the second user with a first session object corresponding to the first user; and
associate a second source IP address of the second user and a first destination IP address of the first user with a second session object corresponding to the second user; and
if the selected packet is received from the network interface:
associate the second source IP address and the first destination IP address with the first session object; and
associate the first source IP address and the second destination IP address with the second session object.

2. The apparatus of claim 1, wherein the flow manager is further operable to:
associate the one or more packets of the peer-to-peer transaction to the first session object if a source IP address of the selected packet is associated with the first user and a destination IP address is associated with second user if the selected packet is received from the subscriber interface, or if the source IP address is associated with the second user and the destination IP address is associated with the first user if the selected packet is received from the network interface; and
associate the one or more packets of the peer-to-peer transaction to the second session object if the source IP address of the selected packet is associated with the second user and the destination IP address of the selected packet is associated with the first user if the selected packet is received from the subscriber interface, or if the source IP address of the selected packet is associated with the first user and the destination IP address of the selected packet is associated with the second user if the selected packet is received from the network interface.

3. The apparatus of claim 1, wherein the client services packet gateway is further operable to:
generate a first billing record from the first session object, wherein the first billing record is associated with the first end user; and
generate a second billing record from the second session object, wherein the second billing record is associated with the second end user.

4. The apparatus of claim 1, wherein the flow manager is further operable to route the selected packet to create a new flow.

5. The apparatus of claim 4, wherein the flow manager is configured for internal routing to a processor.

6. The apparatus of claim 4, wherein the flow manager is configured for next-hop routing, wherein the selected packet is routed to a L3 switch or a router and routed back to the client services packet gateway.

7. The apparatus of claim 5, wherein the selected packet routed back to the client services packet gateway is received on the network interface.

8. The apparatus of claim 1, wherein a first processor processes the first session object and a second processor processes the second session object.

9. The apparatus of claim 1, wherein the flow manager is further operable to search an end user database using the source IP address of the packet if the selected packet is received from the subscriber interface or the destination IP address of the selected packet if the selected packet is received from the network interface.

10. A method, comprising:
    receiving one or more packets of a peer-to-peer transaction from one or more interfaces, wherein an interface is a subscriber interface or a network interface;
    if a selected packet is received from the subscriber interface:
        associating a first source Internet Protocol (IP) address corresponding to the first user and a second destination IP address corresponding to the second user with a first session object corresponding to a first user; and
        associating a second source IP address of the second user and a first destination IP address of the first user with a second session object corresponding to the second user; and
    if the selected packet is received from the network interface:
        associating the second source IP address and the first destination IP address with the first session object; and
        associating the first source IP address and the second destination IP address with the second session object.

11. The method of claim 10, the first session object comprises a source IP address associated with the first user and a destination IP address associated with the second user if a selected packet is received from the subscriber interface or the source IP address associated with the second user and the destination IP address associated with the first user if the selected packet is received from the network interface and the second session object comprises a source IP address associated with the second user and a destination IP address associated with the first user if the selected packet is received from the subscriber interface or the source IP address associated with the first user and the destination IP address associated with the second user if the selected packet is received from the network interface.

12. The method of claim 10, further comprising:
    associating the one or more packets of the peer-to-peer transaction to the first session object if a source IP address of the selected packet is associated with the first user and a destination IP address is associated with second user if the selected packet is received from the subscriber interface, or if the source IP address is associated with the second user and the destination IP address is associated with the first user if the selected packet is received from the network interface; and
    associating the one or more packets of the peer-to-peer transaction to the second session object if the source IP address of the selected packet is associated with the second user and the destination IP address of the selected packet is associated with the first user if the selected packet is received from the subscriber interface, or if the source IP address of the selected packet is associated with the first user and the destination IP address of the selected packet is associated with the second user if the selected packet is received from the network interface.

13. The method of claim 10, further comprising:
    generating a first billing record from the first session object, wherein the first billing record is associated with the first end user; and
    generating a second billing record from the second session object, wherein the second billing record is associated with the second end user.

14. The method of claim 10, further comprising routing the selected packet to create a new flow.

15. The method of claim 14, wherein the selected packet is internally routed to a processor in a client services packet gateway.

16. The method of claim 14, wherein the selected packet is next-hop routed to a L3 switch or a router and routed back to a client services packet gateway.

17. The method of claim 10, wherein a first processor processes the first session object and a second processor processes the second session object.

18. The method of claim 10, further comprising searching an end user database using the source IP address of the selected packet if the selected packet is received from the subscriber interface or the destination IP address of the selected packet if the selected packet is received from the network interface.

19. An apparatus, comprising:
    means for receiving one or more packets of a peer-to-peer transaction from one or more interfaces, wherein the interface is a subscriber interface or a network interface;
    means for, if a selected packet is received from the subscriber interface:
        associating a first source Internet Protocol (IP) address corresponding to the first user and a second destination IP address corresponding to the second user with a first session object corresponding to a first user; and
        associating a second source IP address of the second user and a first destination IP address of the first user with a second session object corresponding to the second user; and
    means for, if the selected packet is received from the network interface:
        associating the second source IP address and the first destination IP address with the first session object; and
        associating the first source IP address and the second destination IP address with the second session object.

* * * * *